United States Patent [19]
Devane et al.

[11] Patent Number: 6,145,870
[45] Date of Patent: *Nov. 14, 2000

[54] AIRBAG HOUSING ASSEMBLY

[75] Inventors: Christopher John Devane, Coventry; Michael Thomas Monaghan, Birmingham, both of United Kingdom

[73] Assignee: Rover Group Limited, Warwick, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/054,166

[22] Filed: Apr. 2, 1998

[30] Foreign Application Priority Data

Apr. 24, 1997 [GB] United Kingdom ............... 9708287

[51] Int. Cl.⁷ .................................................. B60R 21/16
[52] U.S. Cl. ................................... 280/728.2; 280/728.3; 280/732; 280/730.1; 280/730.2
[58] Field of Search ............................. 280/743.1, 728.2, 280/728.3, 732, 730.1, 730.2, 752

[56] References Cited

U.S. PATENT DOCUMENTS

| | | | |
|---|---|---|---|
| 5,332,257 | 7/1994 | Rogerts et al. ........................ | 280/728.2 |
| 5,403,034 | 4/1995 | Gans et al. ............................ | 280/728 B |
| 5,433,471 | 7/1995 | Shepherd et al. .................... | 280/732 X |
| 5,533,746 | 7/1996 | Whited .............................. | 280/728.3 X |
| 5,651,562 | 7/1997 | Hagen et al. ........................ | 280/728.3 |
| 5,806,882 | 9/1998 | Stein et al. .......................... | 280/730.2 |
| 5,810,389 | 9/1998 | Yamaji et al. ....................... | 280/730.2 |
| 5,810,390 | 9/1998 | Enders et al. ....................... | 280/730.2 |
| 5,845,932 | 12/1998 | Kimura et al. ...................... | 280/730.2 |
| 5,906,395 | 5/1999 | Isaji et al. ........................... | 280/743.1 |

FOREIGN PATENT DOCUMENTS

| | | |
|---|---|---|
| 0 695 671 A1 | 2/1996 | European Pat. Off. . |
| 0 722 862 A1 | 7/1996 | European Pat. Off. . |
| 0 743 230 A2 | 11/1996 | European Pat. Off. . |
| 43 15 853 A1 | 11/1994 | Germany . |
| 2 280 645 | 2/1995 | United Kingdom . |
| 2 293 355 | 3/1996 | United Kingdom . |
| 96/30232 | 10/1996 | WIPO . |

*Primary Examiner*—Lanna Mai
*Assistant Examiner*—Toan To
*Attorney, Agent, or Firm*—Davis and Bujold

[57] ABSTRACT

An airbag housing assembly for the passenger compartment of a motor vehicle is described in which a flexible strap (7, 107) is provided to attach a trim member (30, T) to a structural part (42, B) of the vehicle. The strap (7, 107) prevents the trim member (30, T) from becoming completely detached from the structural part (42, B) upon deployment of an airbag "A" housed between the trim panel (30, T) and the structural part (42, B).

16 Claims, 3 Drawing Sheets

AIRBAG HOUSING ASSEMBLY

FIELD OF THE INVENTION

This invention relates to an airbag housing assembly for the passenger compartment of a motor vehicle and in particular to a plastic trim panel used to cover the interior surface of parts of the body structure of the vehicle and house an inflatable airbag.

BACKGROUND TO THE INVENTION

It is known to provide an airbag for a motor vehicle housed in the dashboard or steering wheel of a motor vehicle. More recently it has been proven desirable to house airbags in other areas of the motor vehicle such as along the side of the interior roof structure or within the windscreen supports. It is a problem with such airbag locations that the airbag must be concealed from view but must be able to deploy very rapidly upon impact of the vehicle with another body.

SUMMARY OF THE INVENTION

According to the invention there is provided an airbag housing assembly for a passenger compartment of a motor vehicle comprising an elongate thin plastic cover for attachment to an interior structural member of the passenger compartment and an attachment means to attach the cover to the structural member wherein the assembly includes a flexible retainer means to prevent the cover from becoming fully detached from the structural member upon deployment of the airbag.

The retainer means may be a strap.

The strap may be a length of woven webbing.

Alternatively, the strap may be a length of flexible plastics material.

The length of flexible plastics material may be in the form of a folded strip of plastics material.

The attachment means may include at least one metal clip for engagement with an aperture in the structural member.

The or each clip may have a fixing thereon to which the flexible retainer means is attached.

One end of said retainer means may be fastened to the cover.

The retainer means may be fastened to an integral anchor means formed as part of the cover.

BRIEF DESCRIPTION OF THE DRAWINGS

An airbag housing assembly in accordance with the invention will now be described by way of example with reference to the accompanying drawings in which.

DESCRIPTION OF THE INVENTION

Figure 1:
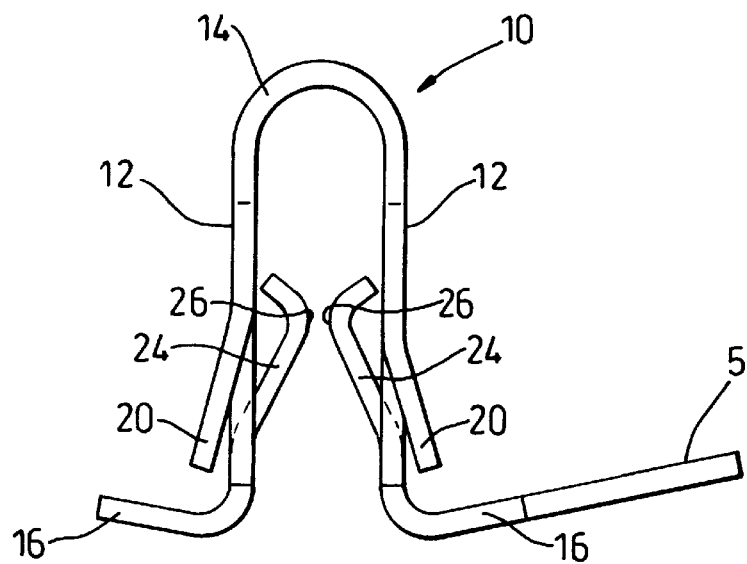
FIG. 1 is an end elevation of a retaining clip forming part of a trim panel retaining means in accordance with a first embodiment of the invention.

With particular reference to FIGS. 1 to 4 there is shown mounting means in the form of a retaining clip 10 formed in one piece from material such as spring steel. The retaining clip 10 comprises two side portions 12 interconnected by means of a bridge section 14. The side portions terminate at their lower ends as shown in the drawings at two outwardly and upwardly projecting abutment members 16.

One of the abutment members 16 has an extended end portion 5 in which there is formed an aperture 6. (See FIG. 4)

Figure 2:
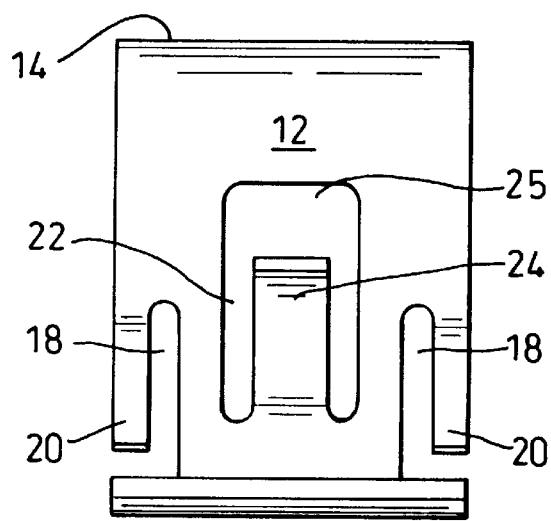
FIG. 2 is a side view of the retaining clip shown in FIG. 1.

Each of the side portions 12 is formed with two slots 18 (FIG. 2). Each slot 18 extends inwardly from an edge of its side portion 12 and then turns through a right angle so as to extend towards the bridge portion 14. The presence of the slots 18 results in the formation of two leaves 20 one on each side portion 12. As will be appreciated from FIGS. 1 and 3, each of the leaves 20 is bent outwardly about its upper end as viewed in the drawings so as to project from the side members 12.

Each side member 12 is also formed with an inverted U shaped slot 22 so as to provide retaining members 24 for the trim panel. As will be appreciated from FIGS. 1 and 3, the retaining members 24 are bent inwardly towards each other with their upper ends bent outwardly away from each other. The forming of the upper ends of the retaining members 24 in that way provides curved camming surfaces 26 the function of which will be described below.

Figure 3:
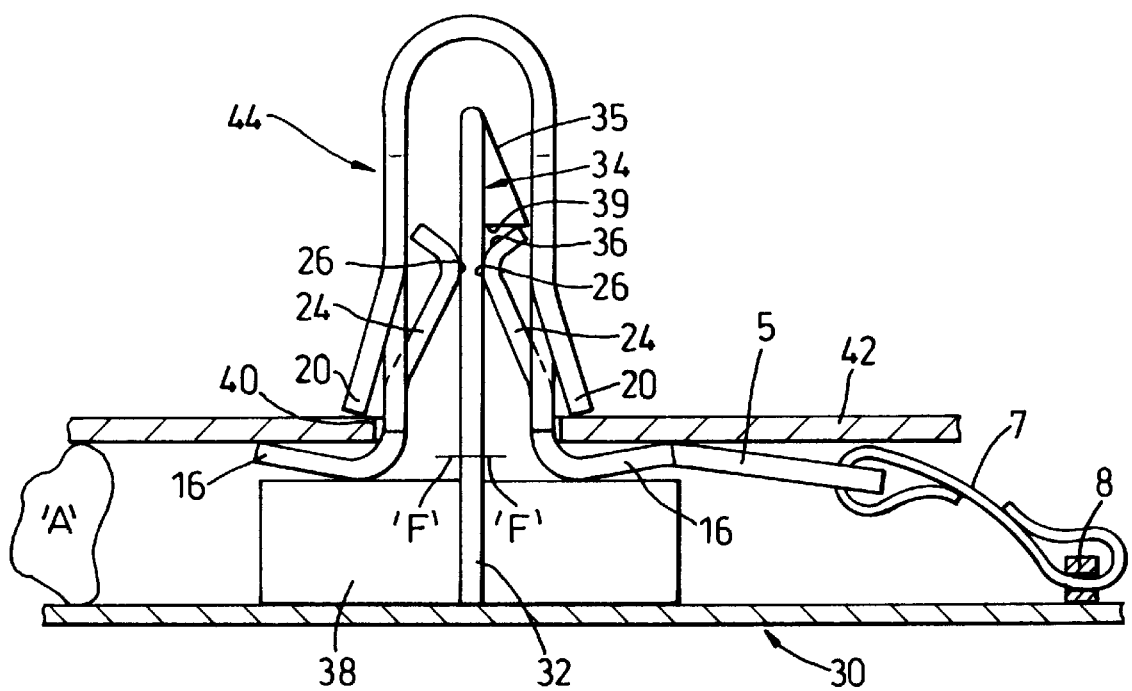
FIG. 3 shows an end view of the clip of FIG. 1 in position on a vehicle body forming in combination with a strap a trim panel retaining means in accordance with the first embodiment of the invention.
Figure 4:
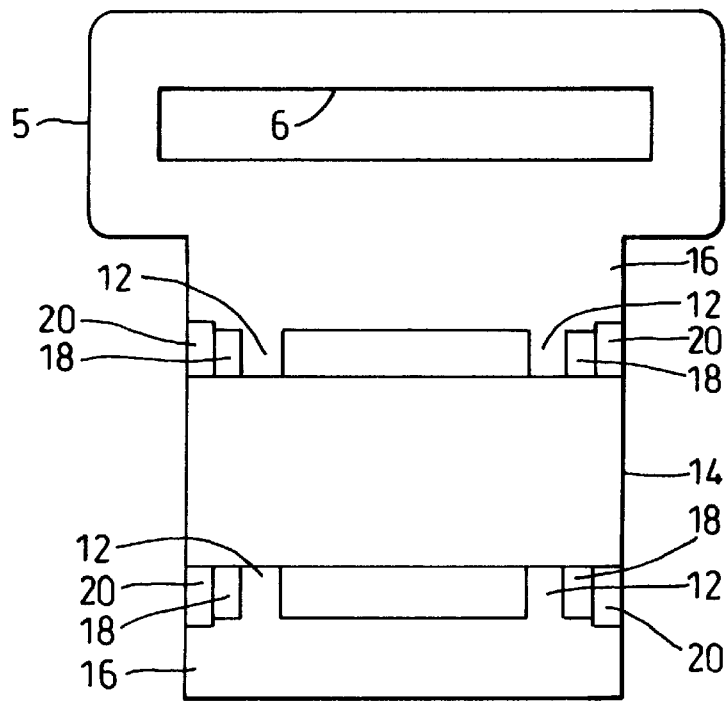
FIG. 4 is a plan view of the retaining clip shown in FIG. 1.

As shown in FIG. 3, a trim panel 30 anchor means in the form of has a portion extending therefrom in the form of a blade 32. The upper end of the blade 32 as viewed in the drawing is formed with a projection 34. The projection has an inclined camming surface 35 and a second normal abutment surface 39. It will also be noted that the trim panel 30 is formed with a transverse web 38 constituting a stop member.

An airbag "A" (shown schematically on FIG. 3) is interposed between the trim panel 30 and a vehicle body portion or member 42 for deployment in the event of a severe collision.

To prevent the trim panel 30 from becoming fully detached from the body 42 when the airbag "A" inflates, a flexible retainer; and means is provided in the form of a flexible strap 7 which is engaged at one end with the aperture 6 in the clip 10 and is anchored at the other end to the trim panel 30 by means of an aperture lug 8 moulded as an integral part of the trim panel 30.

The flexible strap 7 is made from a woven webbing material of the type used in the manufacture of safety belts. This material is strong but light and very flexible allowing it to be easily packaged within the confines of the trim panel 30.

In use, the blade 32 of the trim panel 30 is initially assembled on to the clip 10 by pushing the projection 34 into the clip so that the camming surface 35 contacts the camming surface 26 of the right hand retaining member 24. The pushing in of the projection 34 causes the retaining members 24 to be moved apart to allow the projection 34 to move into the position shown in FIG. 3 in which it is trapped by the abutment surface 39.

The interengagement of the end portion 36 of the camming surface with the abutment 39 ensures that the clip 10 and trim panel 30 are firmly secured together and cannot be separated.

With the clip 10 in position on the trim panel 30, the clip is then located in an aperture 40 formed in a vehicle body member 42 such as an door post. The side portions 12 and bridge section 14 together form a projection 44 which is inserted into the aperture 40. The step of inserting the projection 44 causes the sides of the aperture 40 to urge the leaves 20 inwardly so that they pass through the aperture 40. As will be noted from FIG. 3, the outer ends of the abutment members 16 contact one side of the body member 42 and continued inward movement of the projection 44 causes the abutment members 16 to flex slightly until the leaves 20 clear the aperture 40 and are able to snap outwards into the position shown in FIG. 3. In that way, the clip 10 will be secured firmly on to the body member 42 with the body member resiliently gripped between the abutment members 16 and the leaves 20.

The non-return effect of the leaves 20 ensures that the clip 10 remains secured on the body member 42 and cannot become disengaged from the blade 32 of the trim panel 30.

In the event of a severe impact between the vehicle upon which the trim panel 30 is fitted and another object the airbag "A" will inflate causing the blade 32 to fracture along the line 'F'—'F' and allowing the airbag to escape from its stored position between the trim panel 30 and the body part 42, i.e. the anchor means is frangible.

However the clip 10 and the outer end of the blade remain firmly attached to the body part 42, the leaves 20 preventing disengagement. After initial movement of the trim panel 30 away from the body part 42 the strap 7 becomes taut thereby preventing any further movement of the trim panel 30 away from the body part 42. This ensures that the trim panel 30 is not free to move around in the passenger compartment and cause injury to occupants of the motor vehicle but does not unduly hinder the deployment of the airbag "A".

Figure 5:
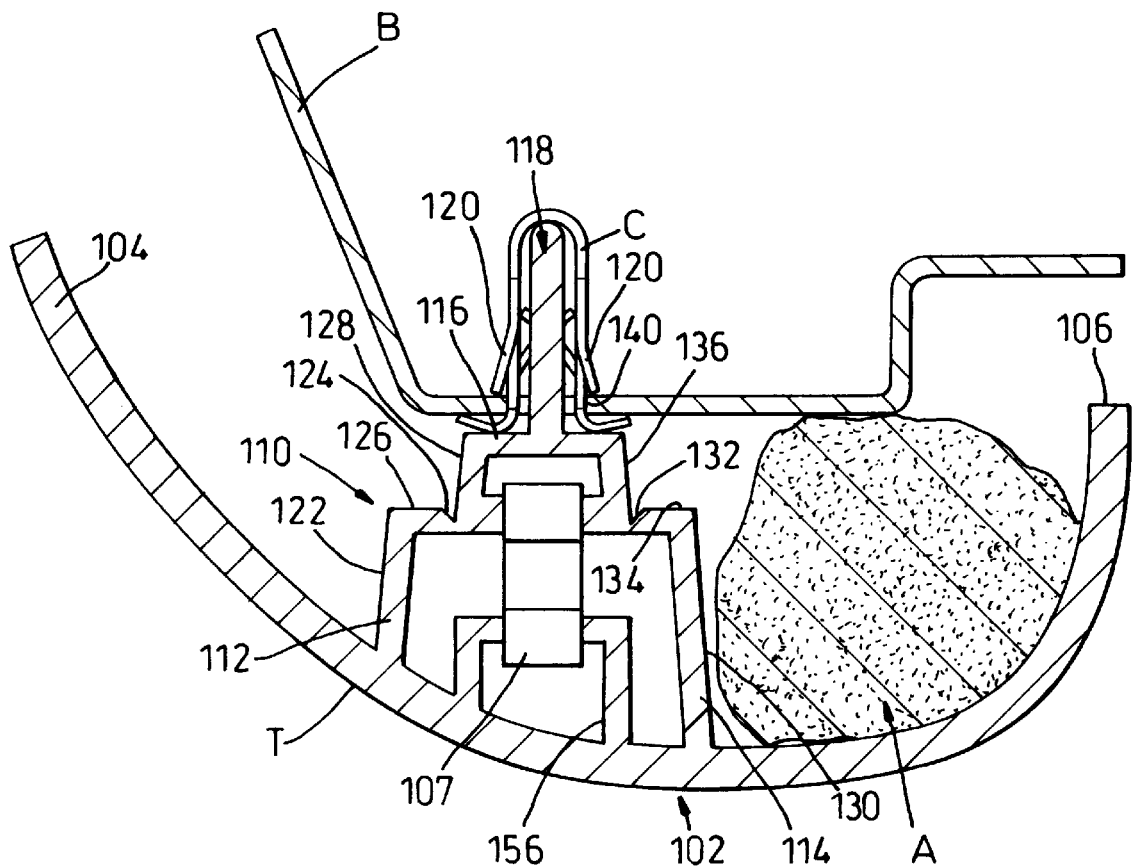
FIG. 5 is a view similar to FIG. 3 but showing a second embodiment of the invention.

With particular reference to FIG. 5 there is shown a trim fixing 110 attached to a trim panel T. The trim panel T, comprises a plate like structure having a main panel portion 102 and lateral panel portions 104 and 106.

The trim fixing 110 is integrally moulded as part of trim panel T which is made from a resilient plastic material such as polypropylene.

The trim fixing comprises of a mounting member 110 having a first leg 112 and second leg 114 which meet at an upper joining portion 116 and extending upwardly from portion 116 a fixing means in the form of a flange 118. The trim fixing 110 and the flange 118 are formed as an integral part of the trim panel T by being co-moulded therewith.

The legs 112 and 114 each comprise of three portions.

The leg 112 has a lower leg portion 122 which is joined to trim moulding panel portion 102, an upper leg portion 128 which is joined to the upper joining portion 116 and a cross member 126.

At the inner end of the cross member 126 there is a recess in the form of a groove 124. The groove 124 reduces the thickness of the cross member 126 and acts as a failure initiator during use.

The cross member 126 is thinner than either of the lower and upper portions 122 and 128 and is designed to fail when a pre-determined shear load is applied, the presence of the groove 124 ensures a more uniform failure mode by acting as a failure initiator.

The leg 114 has a lower leg portion 130 which is joined to the main panel portion 102, an upper leg portion 136 which is joined to the upper joining portion 116 and a cross member 134.

At the inner end of the cross member 134 there is a recess in the form of a groove 132. The groove 132 reduces the thickness of the cross member 134 and acts as a failure initiator during use.

The cross member 134 is thinner than either of the lower and upper portions 130 and 136 and is designed to fail when a pre-determined shear load is applied, the presence of the groove 132 ensures a more uniform failure mode by acting as a failure initiator In use a mounting means in the form of a spring clip C is used to grip the fixing flange 118 within an aperture in a mounting aperture 140 on a body panel B of a vehicle. Two outwardly projecting leaves 120 on the spring clip C prevent the withdrawal of the flange 118 from the aperture 140 as described above with reference to FIGS. 1 to 4.

A strap 107 in the form of folded length of flexible plastic material is attached at one end to central portions of the cross member portions 126, 134 and at the other end to an anchor 156 formed on the inside surface of the trim panel "T".

In the event of an airbag "A" inflating the fixing 110 is designed to break at cross members 126 and 134 thereby allowing the trim panel "T" to move away from the body panel B. The trim panel "T" is prevented from becoming completely detached from the body panel "B" by the strap 107 which is extended until it is taut and then restricts further movement of the trim panel "T" away from the body panel "B".

Figure 6:
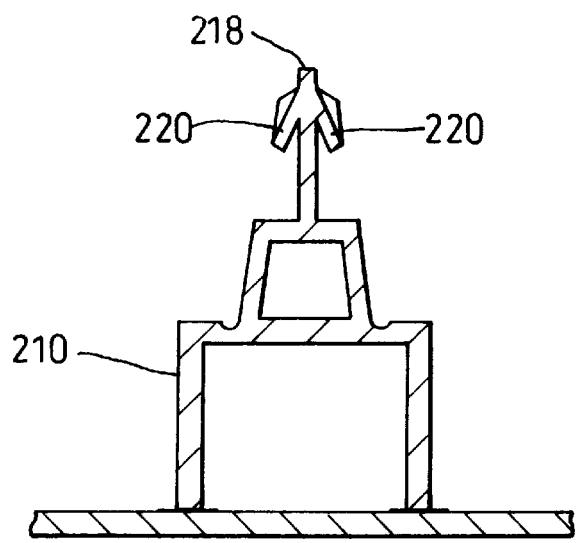
FIG. 6 is an end view of an alternative panel attachment means.

With reference to FIG. 6 there is shown a trim fixing 210 that is in most respects the same as that shown in FIG. 5 but in which the flange 218 has two integrally formed barbs 220 extending therefrom to replace the function of the spring clip 'C'.

It will be appreciated by the man skilled in the art that each trim panel would have several such trim fixing means spaced out along its length.

What we claim is:

1. An airbag housing assembly having a body portion, an airbag means associated with the body portion, a trim panel including integrally formed frangible anchor means, mounting means secured between the body portion and the anchor means, and flexible retainer means connected to the trim panel to retain said trim panel to the body portion upon deployment of the airbag means, the anchor means comprising a trim fixing formed integrally with the trim panel and a flange extending from the trim fixing to engage the mounting means, the trim fixing further comprising an upper joining part which is frangible and offset from a lower part with a groove in a cross member therebetween, the flange extending from the upper part and being frangible with that upper part through the groove, breaking when subjected to a load placed on the flange, the retainer means being secured between the upper part of the trim fixing and the trim panel.

2. The airbag housing assembly according to claim 1, wherein the flexible retainer means is secured between the mounting means and the trim panel.

3. The airbag housing assembly according to claim 1, wherein the retainer means is a strap.

4. The airbag housing assembly according to claim 3, wherein the strap is a length of woven webbing.

5. The airbag housing assembly according to claim 3, wherein the strap is a length of flexible plastics material.

6. The airbag housing assembly according to claim 5, wherein the length of flexible plastics material is in the form of a folded strip of plastics material.

7. The airbag housing assembly according to claim 1, wherein the mounting means comprises at least one metal clip for engagement with an aperture defined in the body portion.

8. The airbag housing assembly according to claim 7 wherein the at least one clip has a fixing thereon to which the flexible retainer means is attached.

9. The airbag housing assembly according to claim 7, wherein the at least one clip is provided with retaining members to secure the at least one clip to the anchor means.

10. The airbag housing assembly according to claim 7, wherein the at least one clip is provided with abutment members to secure the at least one clip to the body portion.

11. The airbag housing assembly according to claim 1, wherein the anchor means comprises a blade upstanding from the trim panel, and the blade is provided with a projection for engagement with the mounting means.

12. The airbag housing assembly according to claim 1, wherein the mounting means is formed integrally with the anchor means.

13. The airbag housing assembly according to claim 1, wherein one end of said retainer means is fastened to the cover.

14. The airbag housing assembly according to claim 13, wherein the retainer means is fastened to the anchor means formed as an integral part of the trim panel.

15. An airbag housing assembly having:

a body portion;

an airbag assembly associated with the body portion;

a trim panel including an integrally formed frangible anchor;

a mounting mechanism being secured between the body portion and the anchor;

a flexible retainer connected to the trim panel to retain said trim panel to the body portion upon deployment of the airbag; and the anchor comprises a trim fixing formed integrally with the trim panel and a flange extends from the trim fixing, the trim fixing further comprises an upper part which is frangible from a lower part, and the flexible retainer is secured between the upper part of the trim fixing and the trim panel.

16. The airbag housing assembly according to claim 15, wherein the mounting mechanism is formed integrally with the anchor.

* * * * *